US012568470B2

(12) United States Patent (10) Patent No.: US 12,568,470 B2
Hong (45) Date of Patent: Mar. 3, 2026

(54) METHOD AND DEVICE FOR TRANSMITTING AND RECEIVING INTER-UE COORDINATION INFORMATION IN SIDELINK COMMUNICATION

(71) Applicants:HYUNDAI MOTOR COMPANY, Seoul (KR); KIA CORPORATION, Seoul (KR)

(72) Inventor: Ui Hyun Hong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 651 days.

(21) Appl. No.: 17/836,496

(22) Filed: Jun. 9, 2022

(65) Prior Publication Data

US 2022/0303956 A1 Sep. 22, 2022

Related U.S. Application Data

(63) Continuation of application No. PCT/KR2022/003772, filed on Mar. 17, 2022.

(30) Foreign Application Priority Data

Mar. 18, 2021 (KR) ........................ 10-2021-0035088
Apr. 14, 2021 (KR) ........................ 10-2021-0048287
Jan. 20, 2022 (KR) ........................ 10-2022-0008753

(51) Int. Cl.
*H04W 72/02* (2009.01)
*H04L 1/1812* (2023.01)
(Continued)

(52) U.S. Cl.
CPC ........... *H04W 72/02* (2013.01); *H04L 1/1812* (2013.01); *H04L 5/0053* (2013.01);
(Continued)

(58) Field of Classification Search
CPC ............. H04W 72/02; H04W 72/0446; H04W 72/0453; H04W 72/20; H04W 92/18;
(Continued)

(56) References Cited

U.S. PATENT DOCUMENTS

2022/0232519 A1* 7/2022 Nguyen ................ H04W 72/20
2022/0232585 A1* 7/2022 Park .................. H04W 72/1263
(Continued)

FOREIGN PATENT DOCUMENTS

CN 112333661 A 2/2021
WO 2021/027755 A1 2/2021

OTHER PUBLICATIONS

3GPP, "Discussion on feasibility and benefits for mode 2 enhancements", 3GPP TSG RAN WG1 Meeting #104-e, R1-2100518, e-Meeting, Jan. 25-Feb. 5, 2021, 26 pages (Year: 2021).*
(Continued)

*Primary Examiner* — Chae S Lee
(74) *Attorney, Agent, or Firm* — Morgan Lewis & Bockius LLP

(57) ABSTRACT

A method of a first UE may include: generating inter-UE coordination information including a resource set; determining a transmission scheme of the inter-UE coordination information based on a type of the resource set; and transmitting a container including the inter-UE coordination information to a second UE based on the transmission scheme, in which the container varies depending on the transmission scheme.

9 Claims, 10 Drawing Sheets

(51) Int. Cl.
    *H04L 5/00*         (2006.01)
    *H04W 72/0446*     (2023.01)
    *H04W 72/0453*     (2023.01)
    *H04W 72/20*       (2023.01)
    *H04W 92/18*       (2009.01)

(52) U.S. Cl.
    CPC ... *H04W 72/0446* (2013.01); *H04W 72/0453*
        (2013.01); *H04W 72/20* (2023.01); *H04W*
                                     *92/18* (2013.01)

(58) Field of Classification Search
    CPC ...... H04W 72/04; H04W 4/40; H04L 1/1812;
               H04L 5/0053; H04L 1/18; H04L 1/1854;
                    H04L 1/1861; H04L 1/1896; H04L
                             5/0044; H04L 5/0091
    See application file for complete search history.

(56) References Cited

U.S. PATENT DOCUMENTS

2023/0403730 A1    12/2023    Shen et al.
2024/0015755 A1\*    1/2024    Pan ....................... H04W 72/25

OTHER PUBLICATIONS

3GPP, "Discussion on feasibility and benefits for mode 2 enhancements", 3GPP TSG RAN WG1 #104-e, RI-2100947,e-Meeting, Jan. 25-Feb. 5, 2021, pp. 1-7. (Year: 2021).\*

3GPP TSG RAN WG1 #103-e: Feature lead summary for AI 8.11.2.2, Feasbility and benefits for mode 2 enhancements, (R1-2009788) Moderator (LG Electronics), e-Meeting, Oct. 26 through Nov. 13, 2020, pp. 1-79 (Year: 2020).\*

3GPP, "Discussion on feasibility and benefits for mode 2 enhancements", 3GPP TSG RAN WG1 Meeting #104-e, R1-2100518, e-Meeting, Jan. 25-Feb. 5, 2021, 26 pages.

3GPP, "Discussion on feasibility and benefits for mode 2 enhancements", 3GPP TSG RAN WG1 #104-e, RI-2100947, e-Meeting, Jan. 25-Feb. 5, 2021, pp. 1-7.

3GPP, "Discussion on feasibility and benefits for mode 2 enhancements", 3GPP TSG-RAN WG1 Meeting #104-e, R1-2101551, e-Meeting, Jan. 25-Feb. 5, 2021, pp. 1-4.

3GPP, "Feature lead summary for AI 8.11.1.2 Feasibility and benefits for mode 2 enhancements", #3GPP TSG RAN WG1 #104-e, R1-2102167, e-Meeting, Jan. 25-Feb. 5, 2021, pp. 1-69.

Summary for AI 8.11.2.2 Feasibility and benefits for mode 2 enhancements, (R1-2007412) Moderator (LG Electronics), e-Meeting, Aug. 17-28, 2020, pp. 1-33.

Feature lead summary for AI 8.11.2.2 Feasbility and benefits for mode 2 enhancements, (R1-2009788) Moderator (LG Electronics), e-Meeting, Oct. 26 through Nov. 13, 2020, pp. 1-79.

On interruption for PUCCH SCell activation in invalid TA case, (R1-2202268) Nokia, Nokia Shanghai Bell, e-Meeting, Feb. 21 through Mar. 3, 2022, pp. 1-2.

WID revision: NR sidelink enhancement, LG Electronics, (RP-201385) LG Electronics, 3GPP TSG RAN Meeting #88e.Electronic Meeting, Jun. 29 through Jul. 3, 2020, pp. 1-6.

3GPP, "Feasibility and benefits of mode 2 enhancements for inter-UE coordination", 3GPP TSG-RAN WG1 Meeting #104-e, R1-2101804, (Revision of R1-2100688), Online, Jan. 26-Feb. 5, 2021, 15 pages.

3GPP, "Discussion on Mode 2 enhancements", 3GPP TSG RAN WG1 #104-e, R1-2101926, e-Meeting, Jan. 25-Feb. 5, 2021, pp. 1-9.

\* cited by examiner time

▨ : HARQ-PSFCH resource    ▨ : UE coordination-PSFCH resource time

▨ : HARQ-PSFCH resource

▦ : UE coordination B-PSFCH resource

▨ : UE coordination A-PSFCH resource

▤ : UE coordination C-PSFCH resource

METHOD AND DEVICE FOR TRANSMITTING AND RECEIVING INTER-UE COORDINATION INFORMATION IN SIDELINK COMMUNICATION

TECHNICAL FIELD

The present disclosure relates to a sidelink communication technique, and more particularly, to a technique for transmitting and receiving inter-user equipment (UE) coordination information.

BACKGROUND

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, in the sidelink communication, inter-UE coordination information may be used. A UE-A may transmit inter-UE coordination information to a UE-B, and the UE-B may select candidate resource(s) based on the inter-UE coordination information received from the UE-A. However, since methods for transmitting/receiving inter-UE coordination information have not been clearly defined, specific methods for transmitting/receiving inter-UE coordination information are required.

The information disclosed in the Background section above is to aid in the understanding of the background of the present disclosure, and should not be taken as acknowledgement that this information forms any part of prior art.

SUMMARY

One aspect of the present disclosure for solving the above-described problem provides a method and an apparatus for transmitting and receiving inter-UE coordination information in sidelink communication.

A method of a first UE, according to a first exemplary embodiment of the present disclosure for achieving the objective, may include: generating inter-UE coordination information including a resource set; determining a transmission scheme of the inter-UE coordination information based on a type of the resource set; and transmitting a container including the inter-UE coordination information to a second UE based on the transmission scheme, in which the container varies depending on the transmission scheme.

When the type of the resource set is a type A or type B, the container may be a first stage sidelink control information (SCI) or a second stage SCI, the resource set having the type A may indicate a preferred resource, and the resource set having the type B may indicate a non-preferred resource.

When the type of the resource set is a type A or type B, the container may be a medium access control (MAC) control element (CE).

When the type of the resource set is a type C, the container may be a physical sidelink feedback channel (PSFCH), and the resource set having the type C may indicate a conflicting resource.

The PSFCH may be a response to a physical sidelink shared channel (PSSCH) received from the second UE.

The method may further include receiving, from the second UE, a message requesting transmission of the inter-UE coordination information, in which the inter-UE coordination information may be transmitted when the message is received.

A method of a second UE, according to a second exemplary embodiment of the present disclosure for achieving the objective, may include: receiving a container including inter-UE coordination information from a first UE; identifying a type of a resource set included in the inter-UE coordination information based on what type the container has; and performing sidelink communication in consideration of the resource set having the type.

When the container is a first stage sidelink control information (SCI) or a second stage SCI, the type may be identified as a type A or type B, the resource set having the type A may indicate a preferred resource, and the resource set having the type B may indicate a non-preferred resource.

When the container is a medium access control (MAC) control element (CE), the type of the resource set may be identified as a type A or type B.

When the container is a physical sidelink feedback channel (PSFCH), the type of the resource set may be identified as a type C, and the resource set having the type C may indicate a conflicting resource.

The method may further include transmitting, to the first UE, a message requesting transmission of the inter-UE coordination information, in which the inter-UE coordination information may be received after the message is transmitted.

A method of a first UE, according to a third exemplary embodiment of the present disclosure for achieving the objective, may include: receiving a first stage sidelink control information (SCI) from a second UE; receiving, from the second UE, data on a physical sidelink shared channel (PSSCH) indicated by the first stage SCI; and transmitting inter-UE coordination information to the second UE in a first physical sidelink feedback channel (PSFCH) resource associated with the PSSCH.

The method may further include receiving PSFCH configuration information from a base station, in which the PSFCH configuration information may include information on the first PSFCH resource for transmission of the inter-UE coordination information and information on a second PSFCH resource for transmission of a hybrid automatic repeat request-acknowledgement (HARQ-ACK) for the data.

The information on the first PSFCH resource may indicate one or more physical resource blocks (PRBs) used for transmission of the inter-LIE coordination information in a frequency domain, the information on the second PSFCH resource may indicate one or more PRBs used for transmission of the HARQ-ACK in the frequency domain, and the first PSFCH resource and the second PSFCH resource may be multiplexed in the frequency domain.

The information on the first PSFCH resource may indicate one or more symbols used for transmission of the inter-UE coordination information in a time domain, the information on the second PSFCH resource may indicate one or more symbols used for transmission of the HARQ-ACK in the time domain, and the first PSFCH resource and the second PSFCH resource may be multiplexed in the time domain.

The method may further include transmitting the HARQ-ACK for the data to the second UE in the second PSFCH resource indicated.

The method may further include receiving, from the second UE, a second stage SCI associated with the first stage SCI on the PSSCH, in which the second stage SCI may include information indicating a type of a resource set included in the inter-UE coordination information.

When a HARQ feedback operation for the data is enabled, the first PSFCH resource may be used for transmission of the HARQ-ACK for the data, and when the HARQ feedback operation is disabled, the first PSFCH resource may be used for transmission of the inter-UE coordination information.

Advantageous Effects

According to various aspects of the present disclosure, a UE-A may transmit inter-UE coordination information to a UE-B based on a scheme 1 or scheme 2. When the scheme 1 is used, the UE-A may transmit, to the UE-B, sidelink control information (SCI) (e.g., first stage SCI or second stage SCI) or a medium access control (MAC) control element (CE) including the inter-UE coordination information. When the scheme 2 is used, the UE-A may transmit the inter-UE coordination information to the UE-B by using a physical sidelink feedback channel (PSFCH) resource. The UE-B may receive the inter-UE coordination information from the UE-A through the SCI, MAC CE, or PSFCH resource, and may perform sidelink communications using resource(s) selected in consideration of the inter-UE coordination information. Accordingly, the inter-UE coordination information can be efficiently exchanged between the UE-A and the UE-B, and performance of the communication system can be improved.

DETAILED DESCRIPTION

Figure 1:
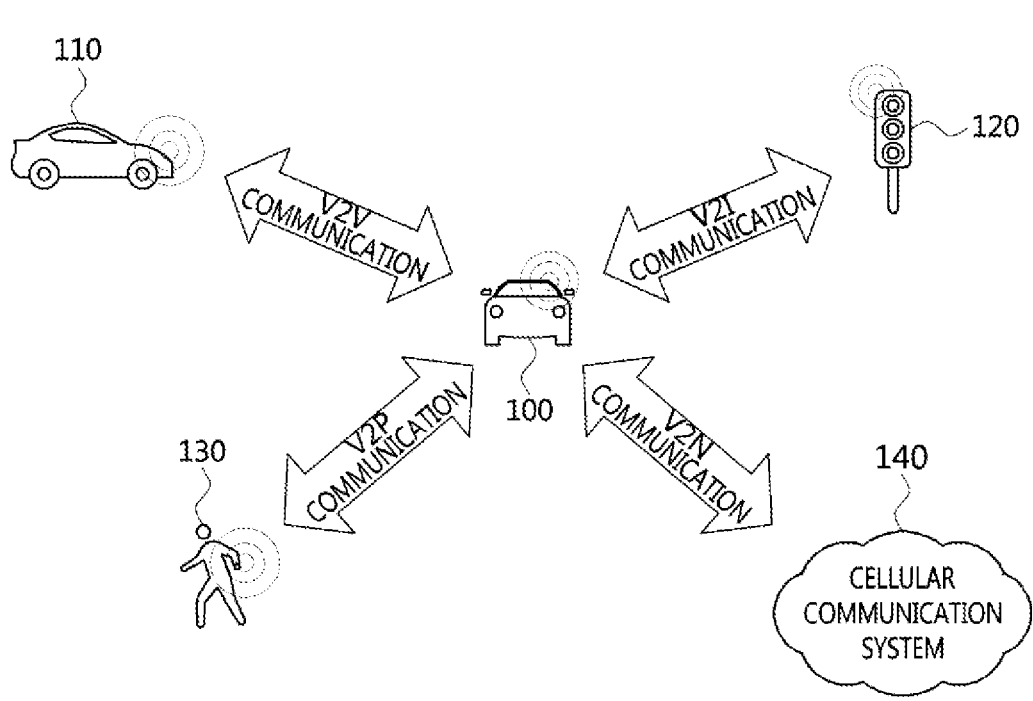
FIG. 1 is a conceptual diagram illustrating V2X communication scenarios.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

In exemplary embodiments of the present disclosure, "(re)transmission" may mean "transmission", "retransmission", or "transmission and retransmission", "(re)configuration" may mean "configuration", "reconfiguration", or "configuration and reconfiguration". "(re)connection" may mean "connection", "reconnection", or "connection and reconnection", and "(re)access" may mean "access", "re-access", or "access and re-access".

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises." "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the first vehicle 100) and a second vehicle 110 (e.g., a communication node located in the second vehicle 110). Various driving information such as velocity, heading, time, position, and the like may be exchanged between the first and second vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the first and second vehicles 100 and 110 may be performed using at least one sidelink channel established between the first and second vehicles 100 and 110.

The V2I communications may include communications between the first vehicle 100 (e.g., the communication node located in the first vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the first vehicle 100 and the infrastructure 120 may be performed using at least one sidelink channel established between the first vehicle 100 and the infrastructure 120.

The V2P communications may include communications between the first vehicle 100 (e.g., the communication node located in the first vehicle 100) and a person 130 (e.g., a communication node carried by the person 130). The driving information of the first vehicle 100 and movement information of the person 130 such as velocity, heading, time, position, and the like may be exchanged between the first vehicle 100 and the person 130 through the V2P communications. The communication node located in the first vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the first vehicle 100 and the communication node carried by the person 130 may be performed using at least one sidelink channel established between the communication nodes.

The V2N communications may be communications between the first vehicle 100 (e.g., the communication node located in the first vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
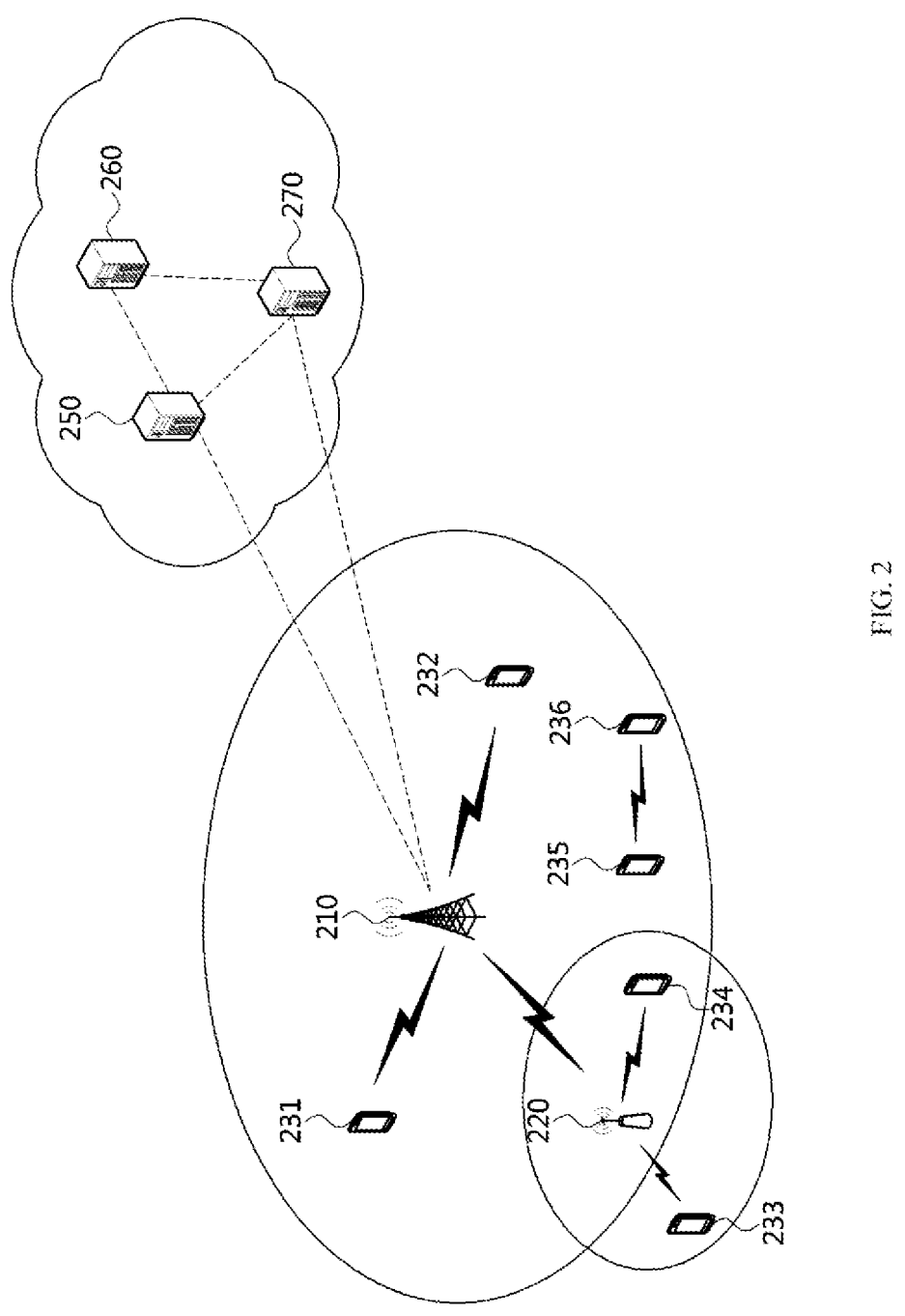
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system 140 may include an access network, a core network, and the like. The access network may include a base station 210, a relay 220, User Equipments (UEs) 231 through 236, and the like. The UEs 231 through 236 may include communication nodes located in the first and second vehicles 100 and 110 of FIG. 1, the communication node located in the infrastructure 120 of FIG. 1, the communication node carried by the person 130 of FIG. 1, and the like. When the cellular communication system 140 supports the 4G communication technology, the core network may include a serving gateway (S-GW)

250, a packet data network (PDN) gateway (P-GW) 260, a mobility management entity (MME) 270, and the like.

When the cellular communication system 140 supports the 5G communication technology, the core network may include a user plane function (UPF) 250, a session management function (SMF) 260, an access and mobility management function (AMF) 270, and the like. Alternatively, when the cellular communication system 140 operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system 140 supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system 140 may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system 140 may be configured as follows.

Figure 3:
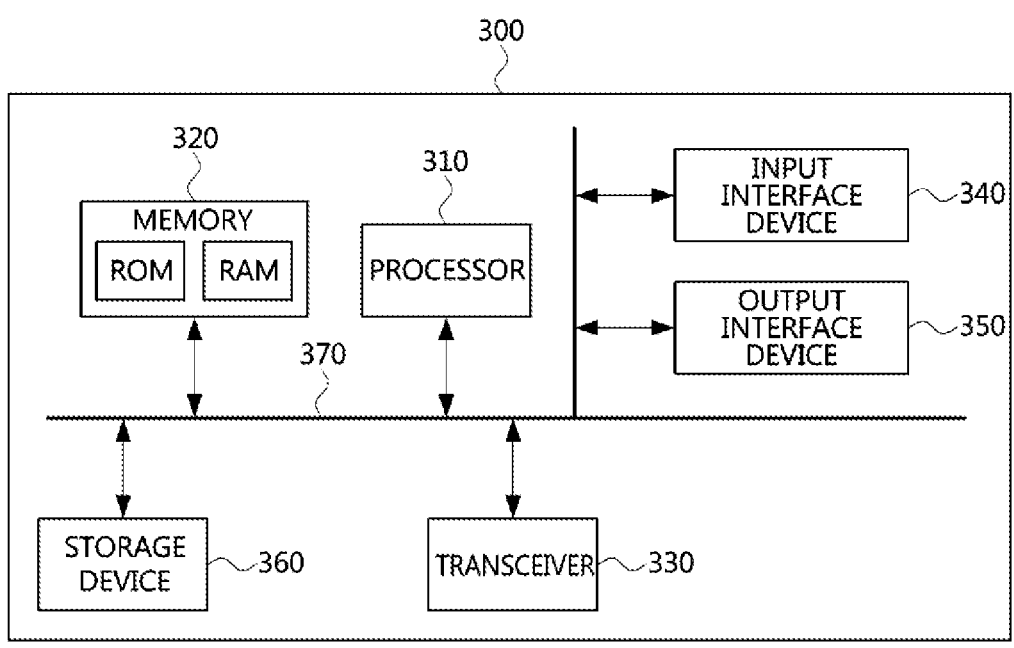
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, or the storage device 360 via a dedicated interface.

The processor 310 may execute at least one instruction stored in at least one of the memory 320 or the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium or a non-volatile storage medium. For example, the memory 320 may comprise at least one of read-only memory (ROM) or random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the IEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the IE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
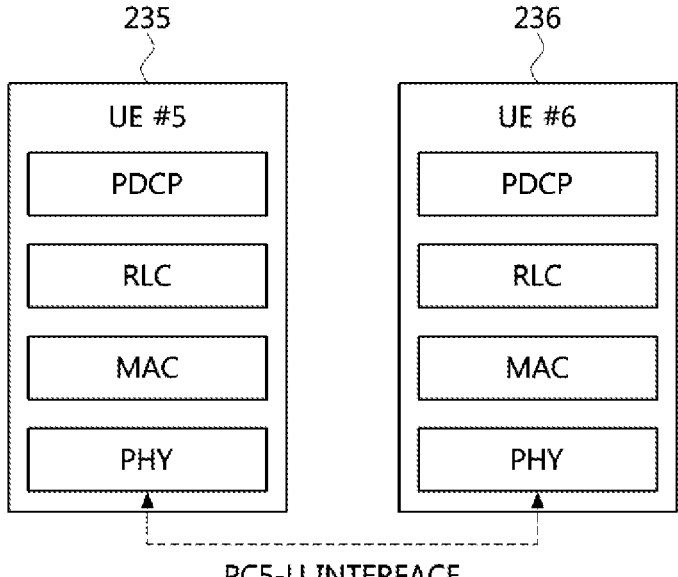
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID)(e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
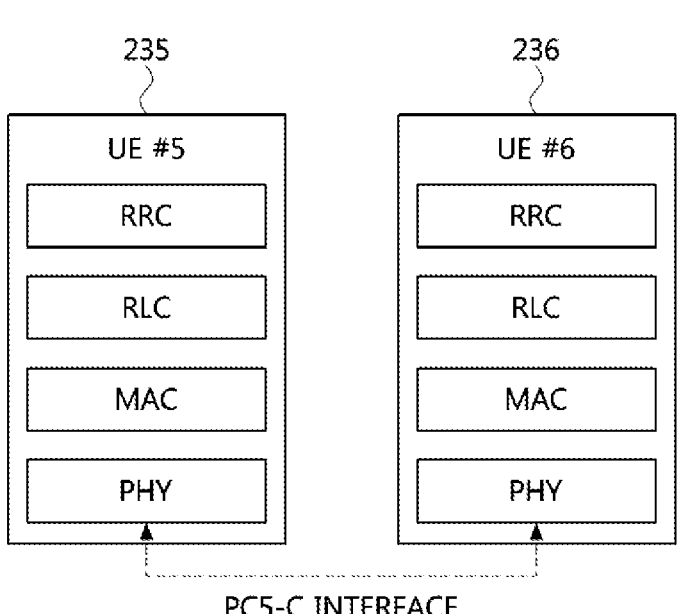
FIG. 5 is a block diagram illustrating a first exemplary embodiment of a control plane protocol stack of a UE performing sidelink communication.
Figure 6:
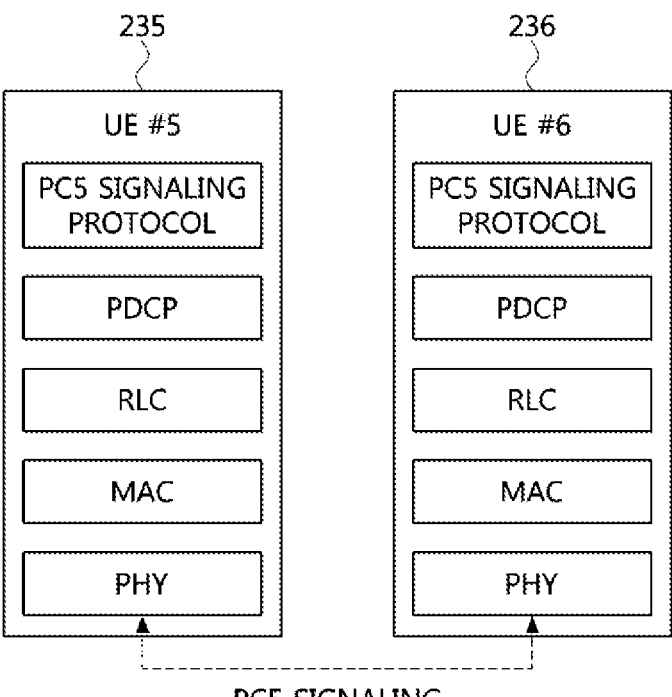
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UTE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A first stage SCI format may include an SCI format 1-A. and a second stage SCI format may include an SCI format 2-A, an SCI format 2-B, and an SCI format 2-C.

The 1st-stage SCI may include or more information elements among priority information, frequency resource assignment information, time resource assignment information, resource reservation period information, demodulation reference signal (DMRS) pattern information, 2nd-stage SCI format information, a beta_offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements. The SCI format 2-C may be used for decoding of a PSSCH and/or providing inter-UE coordination information.

In exemplary embodiments, "an operation (e.g., transmission operation) is configured" may mean "configuration information (e.g., information element(s), parameter(s), etc.) for the operation" and/or "information indicating performing of the operation" is signaled. "information element(s) (e.g., parameter(s)) are configured" may mean that the information element(s) are signaled. The signaling may be at least one of system information (SI) signaling (e.g., transmission of a system information block (SIB) and/or master information block (MIB)), RRC signaling (e.g., transmission of RRC parameter(s) and/or higher layer parameter(s)), MAC control element (CE) signaling, PHY signaling (e.g., transmission of downlink control information (DCI), uplink control information (UCI), and/or sidelink control information (SCI)), or a combination thereof. Here, the MAC CE signaling operation may be performed through a data channel, the PHY signaling operation may be performed through a control channel or a data channel, and the transmission of the SCI may refer to transmission of a first stage SCI and/or a second stage SCI.

Meanwhile, in sidelink communication, inter-UE coordination information may be used. The inter-UE coordination information may be used to solve a hidden node problem, exposed node problem, and/or half-duplex problem. A UE-A may transmit inter-UE coordination information to a UE-B. The UE-A may be a receiving UE (e.g., a UE that receives data), a coordinating UE (e.g., a UE that supports sidelink communication of another UE), or a UE that performs a role similar to that of the coordinating UE. The UE-B may be a transmitting UE (e.g., a UE that transmits data). The UE-A may be referred to as a first UE, and the UE-B may be referred to as a second UE.

The inter-UE coordination information may indicate a resource set. A type of the resource set indicated by the inter-UE coordination information may be classified into a type A, type B, and type C. A resource set having the type A may include preferred (or recommended) resource(s). The preferred resource(s) may be determined based on a sensing result. A resource set having the type B may be include non-preferred (or not-recommended) resource(s). The non-preferred resource(s) may be determined based on a sensing result, an expected resource conflict, and/or a potential resource conflict. A resource set having the type C may include information on a conflicting resource. The conflicting resource may be a resource in which a conflict occurs, a resource in which a conflict is expected to occur, or a resource having a potential conflict. In addition, the inter-UE coordination information may indicate presence of preferred resource(s), presence of non-preferred resource(s), or presence of conflicting resource(s). In exemplary embodiments, a resource set having the type A may be referred to as a resource set A, a resource set having the type B may be referred to as a resource set B. and a resource set having the type C may be referred to as a resource set C.

The UE-B may receive the inter-UE coordination information from the UE-A, and may identify the type of the resource set included in the inter-UE coordination information. The UE-B may select candidate resource(s) for sidelink communication based on the resource set included in the inter-UE coordination information. For example, when the inter-UE coordination information includes the resource set A, the UE-B may select candidate resource(s) including resource(s) belonging to the resource set A. When the inter-UE coordination information includes the resource set B or resource set C, the UE-B may exclude resource(s) belonging to the resource set B or resource set C in a procedure of selecting candidate resource(s). In order to support the operation of the UE-B, condition(s) for identifying the type of the resource set may be required.

The UE-A may transmit the inter-UE coordination information to the UE-B when specific condition(s) are satisfied. For example, the UE-B may transmit, to the UE-A, a trigger message or request message for transmission of the inter-UE coordination information. When the trigger message or request message for transmission of the inter-UE coordination information is received from the UE-B, the UE-A may transmit the inter-UE coordination information to the UE-B. The trigger message or request message may include information indicating the type of resource set required by the UE-B. In this case, the UE-A may transmit inter-UE coordination information including a resource set having the type required by the UE-B to the UE-B. Alternatively, when preconfigured condition(s) or predefined condition(s) are satisfied, the UE-A may transmit the inter-UE coordination information to the UE-B. The preconfigured condition(s) or predefined condition(s) may be configured for each type of resource set.

The above-described specific condition(s) for transmission of inter-UE coordination information may be associated with the type (e.g., type A, type B, or type C) of resource set. The specific condition(s) may be reception of a trigger message, reception of a request message, satisfaction of preconfigured condition(s), and/or satisfaction of predefined condition(s). For example, when inter-UE coordination information is transmitted according to reception of a trigger message, inter-UE coordination information including the resource set A may be configured to be transmitted. Alternatively, in the above-described exemplary embodiment, inter-UE coordination information including the resource set B or resource set C may be configured to be transmitted. For another example, when inter-UE coordination information is transmitted when preconfigured condition(s) or predefined condition(s) are satisfied, inter-UE coordination information including the resource set B may be configured to be transmitted. Alternatively, in the above-described exemplary embodiment, inter-UE coordination information including the resource set A or resource set C may be configured to be transmitted.

The inter-UE coordination information may include one or more information elements defined in Table 3 below.

TABLE 3

| Information elements |
| --- |
| Preferred resources |
| Channel state information (CSI) satisfied by preferred resources |
| Non-preferred resources |
| Power control information |
| Source ID (e.g., source ID having the minimum length) |
| Destination ID (e.g., destination ID hating the minimum length) |
| Demodulation reference signal (DMRS) pattern preferred by a receiving UE |
| Multi-input multi-output (MIMO) enhancement information |
| When a plurality of resources (e.g., three resources) are reserved by a single PSCCH/PSSCH (e.g., single SCI), information on the reserved resources |
| Information of resources for which reservation is released |
| Information of not-used resources among reserved resources |
| Transmission power information |
| Continuous conflict information |
| Resource conflict information |
| Discontinuous reception (DRX) parameter(s) |
| Information not received by a transmitting UE due to a half-duplex operation |
| Information for estimating a distance between communication nodes (e.g., UEs) |
| Reference signal received power (RSRP), reference signal received quality (RSRQ), or received signal strength indicator (RSSI) |
| Channel busy ratio (CBR) |
| Presence of preferred resource(s), presence of non-preferred resource(s), presence of conflicting resource(s) |

The inter-UE coordination information may be transmitted through one or more containers defined in Table 4 below.

TABLE 4

| Container |
| --- |
| First stage SCI (e.g., SCI format 1-A) |
| Second stage SCI (e.g., SCI format 2-A, SCI format 2-B) |
| New second stage SCI (e.g., SCI format 2-C) |
| MAC CE |
| RRC message (e.g., PC5-RRC message) |
| PSFCH (e.g., PSFCH format) |

The transmission of inter-UE coordination information may be performed based on an explicit trigger scheme or an event trigger scheme. When the explicit trigger scheme is used, the UE-B may transmit a trigger message or a request message for transmission of inter-UE coordination information to the UE-A. When the trigger message or request message is received from the UE-B, the UE-A may transmit inter-UE coordination information to the UE-B. When the event triggered scheme is used, the UE-A may transmit inter-LTE coordination information to the UE-B when preconfigured condition(s) or predefined condition(s) are satisfied.

The type (e.g., type A, type B, or type C) of the resource set included in the inter-UE coordination information may be associated with a container including the inter-UE coordination information, a transmission scheme of the inter-UE coordination information (e.g., explicit trigger scheme or event trigger scheme), a cast type of the UE-A (e.g., broadcast, groupcast, multicast, or unicast), a cast type of the UE-B, a surrounding environment of the UE-A (e.g., UE density, channel congestion state, channel quality), and/or a surrounding environment of the UE-B (e.g., UE density, channel congestion state, channel quality).

[Association Relationship Between a Type of a Resource Set Included in Inter-UE Coordination Information and an SCI Including the Inter-UE Coordination Information]

Figure 7:
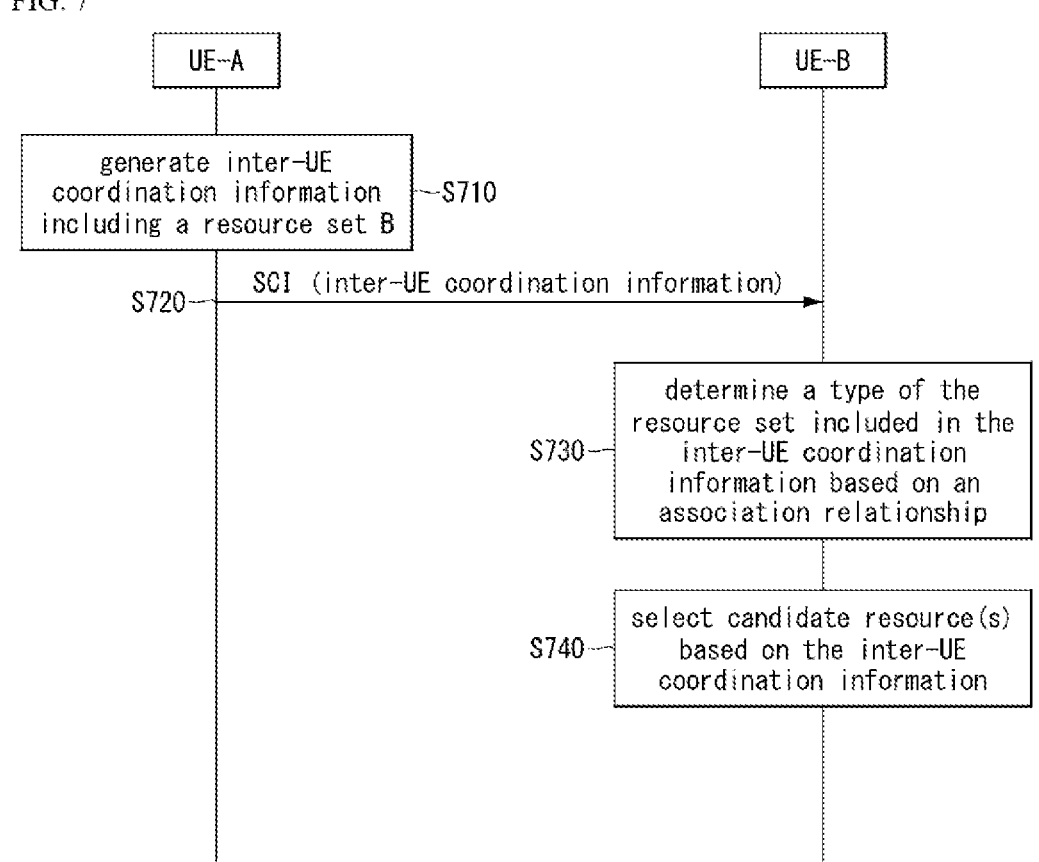
FIG. 7 is a sequence chart illustrating a first exemplary embodiment of a method for transmitting inter-UE coordination information.

FIG. 7 is a sequence chart illustrating a first exemplary embodiment of a method for transmitting inter-UE coordination information.

As shown in FIG. 7, inter-UE coordination information may be transmitted through SCI. In this case, the inter-UE coordination information may be configured to include the resource set B. That is, the inter-UE coordination information including the resource set B may be associated (or mapped) with the SCI. Alternatively, the inter-UE coordination information may include the resource set A or resource set C.

When inter-UE coordination information is configured to be transmitted through SCI, and the transmission of the inter-UE coordination information is triggered based on the explicit trigger scheme or event trigger scheme, the UE-A may generate inter-UE coordination information including the resource set B based on a preconfigured association relationship (or preconfigured mapping relationship) (S710). Alternatively, inter-UE coordination information including the resource set A or resource set C may be generated in the step S710. The transmission of inter-UE coordination information through SCI may be preconfigured by higher layer signaling (e.g., higher layer message) of a base station.

The LTE-A may transmit the SCI including the inter-UE coordination information to the UE-B (S720). The inter-UE coordination information may be included in the SCI format 1-A, SCI format 2-A, SCI format 2-B, and/or SCI format 2-C. The SCI may include information indicating the type (e.g., type B) of the resource set included in the inter-UE coordination information as well as the inter-UE coordination information. For example, a second stage SCI format field included in the SCI format 1-A may indicate the type of the resource set included in the inter-UE coordination information. In this case, the second stage SCI format field may be configured as shown in Table 5 below.

TABLE 5

| Value of second stage SCI format field | Second stage SCI format |
| --- | --- |
| 00 | SCI format 2-A |
| 01 | SCI format 2-B |
| 10 | SCI format 2-C |
| 11 | Type (e.g., type A, type B, or type C) of a resource set included in inter-UE coordination information |

When transmission of SCI including inter-UE coordination information including the resource set A is enabled by higher layer signaling, the second stage SCI format field set to '11' may indicate the type A. When transmission of SCI including inter-UE coordination information including the resource set B is enabled by higher layer signaling, the second stage SCI format field set to '11' may indicate the type B. When transmission of SCI including inter-UE coordination information including the resource set C is enabled by higher layer signaling, the second stage SCI format field set to '11' may indicate the type C. When the inter-UE coordination information is included in the SCI format 2-C, the second stage SCI format field set to '11' may indicate transmission of the SCI format 2-C and the type of the resource set included in the inter-UE coordination information.

Alternatively, the second stage SCI format field may indicate the second stage SCI format and the type of the resource set included in the inter-UE coordination information as shown in Table 6 or 7 below.

TABLE 6

| Value of second stage SCI format field | Second stage SCI format | Type of a resource set included in inter-UE coordination information |
| --- | --- | --- |
| 00 | SCI format 2-A | — |
| 01 | SCI format 2-B | — |
| 10 | SCI format 2-C | Type B |
| 11 | SCI format 2-C | Type C |

TABLE 7

| Value of second stage SCI format field | Second stage SCI format | Type of a resource set included in inter-UE coordination information |
| --- | --- | --- |
| 00 | SCI format 2-A | — |
| 01 | SCI format 2-B | — |
| 10 | SCI format 2-C | Type A |
| 11 | SCI format 2-C | Type B and/or Type C |

Based on Table 6, the second stage SCI format field set to '10' may indicate transmission of the SCI format 2-C and transmission of inter-UE coordination information including the resource set B, and the second stage SCI format field set to '11' may indicate transmission of the SCI format 2-C and transmission of inter-UE coordination information including the resource set C. Based on Table 7, the second stage SCI format field set to '10' may indicate transmission of the SCI format 2-C and transmission of inter-UE coordination information including the resource set A, and the second stage SCI format field set to '11' may indicate transmission of the SCI format 2-C and transmission of inter-UE coordination information including the resource set B and/or resource set C. Alternatively, the SCI format 2-C may include the inter-UE coordination information and information indicating the type of the resource set included in the inter-UE coordination information.

The UE-B may receive the SCI from the UE-A. When the SCI includes the inter-UE coordination information, the UE-B may determine that the corresponding inter-UE coordination information includes the resource set B based on the preconfigured association relationship (S730). Alternatively, when the SCI includes information indicating the type of the resource set included in the inter-UE coordination information (e.g., the second stage SCI format field included in the first stage SCI or information included in the SCI format 2-C), the UE-B may determine the type of the resource set as the type A, type B, or type C based on the information.

The UE-B may select candidate resource(s) in consideration of the inter-UE coordination information (S740). In the step S740, the UE-B may select the candidate resource(s) by excluding resource(s) indicated by the inter-UE coordination information (e.g., resource(s) belonging to the resource set B or the resource set C). Alternatively, in the step S740, the UE-B may select candidate resource(s) including resource(s) (e.g., resource(s) belonging to the resource set A) indicated by the inter-UE coordination information.

[Association Relationship Between a Type of a Resource Set Included in Inter-UE Coordination Information and a Transmission Scheme of the Inter-UE Coordination Information]

The transmission of inter-UE coordination information may be performed based on the explicit trigger scheme or event trigger scheme. Based on Table 8 below, when the transmission operation of the inter-UE coordination information is performed based on the explicit trigger scheme, the inter-UE coordination information may include the resource set B and/or resource set C. When the transmission operation of the inter-UE coordination information is performed based on the event trigger scheme, the inter-UE coordination information may include the resource set A.

TABLE 8

| Transmission scheme of inter-UE coordination information | Type of a resource set included in inter-UE coordination information |
| --- | --- |
| Explicit trigger scheme | Type B and/or Type C |
| Event trigger scheme | Type A |

Alternatively, based on Table 9 below, when the transmission operation of the inter-UE coordination information is performed based on the explicit trigger scheme, the inter-UE coordination information may include the resource set A. When the transmission operation of the inter-UE coordination information is performed based on the event trigger scheme, the inter-UE coordination information may include the resource set B and/or resource set C.

TABLE 9

| Transmission scheme of inter-UE coordination information | Type of a resource set included in inter-UE coordination information |
| --- | --- |
| Explicit trigger scheme | Type A |
| Event trigger scheme | Type B and/or Type C |

[Association Relationship Between a Type of a Resource Set Included in Inter-UE Coordination Information and a Cast Type]

The type of the resource set included in the inter-UE coordination information may vary according to a cast type (e.g., broadcast, groupcast, multicast, unicast) of sidelink communication. Based on Table 10 below, when the sidelink communication is performed based on the unicast scheme, the inter-UE coordination information may include the resource set A. When the sidelink communication is performed based on the broadcast scheme (or groupcast scheme), the inter-UE coordination information may include the resource set B and/or resource set C.

TABLE 10

| Cast type | Type of a resource set included in inter-UE coordination information |
| --- | --- |
| Unicast | Type A |
| Broadcast (or, groupcast) | Type B and/or Type C |

Alternatively, based on Table 11 below, when the sidelink communication is performed based on the unicast scheme, the inter-UE coordination information may include the resource set B and/or resource set C. When the sidelink communication is performed based on the broadcast scheme (or groupcast scheme), the inter-UE coordination information may include the resource set A.

TABLE 11

| Cast type | Type of a resource set included in inter-UE coordination information |
| --- | --- |
| Unicast | Type B and/or Type C |
| Broadcast (or, groupcast) | Type A |

[Association Relationship Between a Type of a Resource Set Included in Inter-UE Coordination Information and a Surrounding Environment of a Communication Node]

The type of the resource set included in inter-UE coordination information may be associated with a surrounding environment of a communication node (e.g., UE-A or UE-B). The surrounding environment may include a UE density, channel congestion state, and/or channel quality. The channel congestion state may be determined based on a channel busy ratio (CBR). The channel quality may be determined based on an RSRP, RSRQ, and/or RSSI.

When a CBR measured by the UE-B is less than or equal to a first threshold, the UE-A may transmit inter-UE coordination information including the resource set A to the UE-B. When the CBR measured by the UE-B is equal to or less than a second threshold, the UE-A may transmit inter-UE coordination information including the resource set B and/or resource set C to the UE-B. Here, the second threshold may be less than the first threshold. Alternatively, when the CBR measured by the UE-B is equal to or greater than a first threshold, the UE-A may transmit inter-UE coordination information including the resource set A to the UE-B. When the CBR measured by the UE-B is equal to or greater than a second threshold, the UE-A may transmit inter-UE coordination information including the resource set B and/or resource set C to the UE-B. Here, the second threshold may be greater than the first threshold.

In order to support the above-described operation, the UE-B may transmit, to the UE-A, the measured CBR, information indicating that the measured CBR is less than or equal to the first threshold, information indicating that the measured CBR is less than or equal to the second threshold, information indicating that the measured CBR is equal to or greater than the first threshold, and/or information indicating that the measured CBR is equal to or greater than the second threshold. The above-described operation may be performed based on a channel quality parameter (e.g., RSRP, RSRQ. RSSI) instead of the CBR.

[Association Relationship Between a Type of a Resource Set Included in Inter-UE Coordination Information and a Container Used for Transmission of the Inter-UE Coordination Information]

A container used for transmission of inter-UE coordination information may be classified into an SCI (e.g., first stage SCI and/or second stage SCI) and a higher layer message (e.g., RRC message (e.g., PC5 RRC message), MAC CE, etc.). The SCI may be configured to be used for transmission of inter-UE coordination information including the resource set A, and the higher layer message may be configured to be used for transmission of inter-UE coordination information including the resource set B and/or resource set C. Alternatively, the SCI may be configured to be used for transmission of inter-UE coordination information including the resource set B and/or resource set C, and the higher layer message may be configured to be used for transmission of inter-UE coordination information including the resource set A.

[Method for Transmitting Inter-UE Coordination Information Using a PSFCH (e.g., PSFCH Format)]

Figure 8:
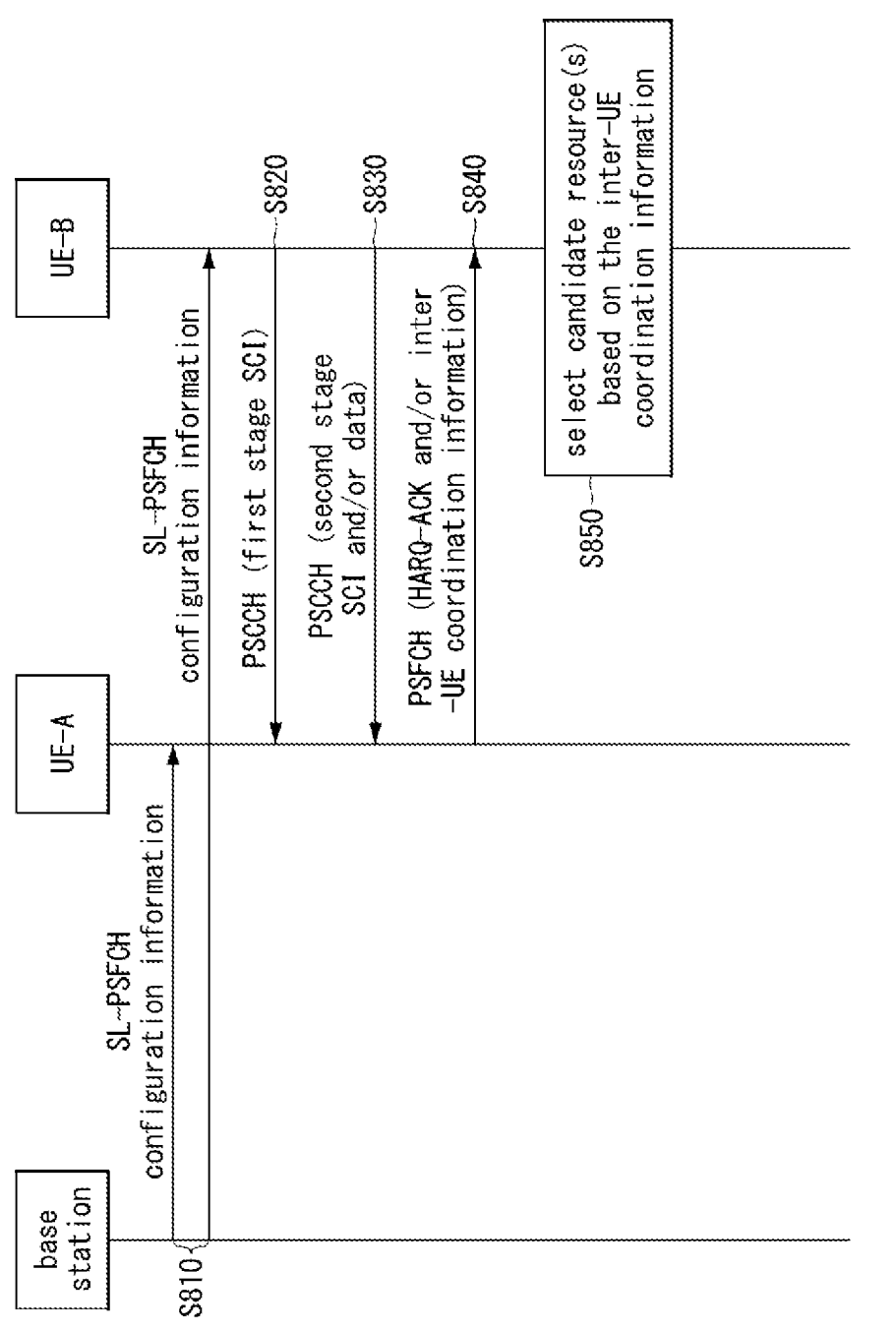
FIG. 8 is a sequence chart illustrating a second exemplary embodiment of a method for transmitting inter-UE coordination information.

FIG. 8 is a sequence chart illustrating a second exemplary embodiment of a method for transmitting inter-UE coordination information.

As shown in FIG. 8, a base station may transmit SL-PSFCH configuration information (e.g., SL-PSFCH-Config) to terminals (e.g., UE-A. UE-B) (S810). The SL-PSFCH configuration information may include PSFCH resource information (hereinafter referred to as 'HARQ-PSFCH resource information') used for transmission of HARQ-acknowledgement (ACK) and PSFCH resource information (hereinafter referred to as 'UE coordination-PSFCH resource information') used for transmission of inter-UE coordination information. The HARQ-PSFCH resource information may be sl-PSFCH-RB-set, and the UE coordination-PSFCH resource information may be sl-PSFCH-RB-set-UECoordination. Each of the HARQ-PSFCH resource information and the UE coordination-PSFCH resource information may be a bitmap. Each bit included in the bitmap may indicate whether one or more physical resource blocks (PRBs) corresponding to the bit are used for PSFCH transmission. The HARQ-PSFCH resources and the UE coordination-PSFCH resources may be configured as follows.

Figure 9:
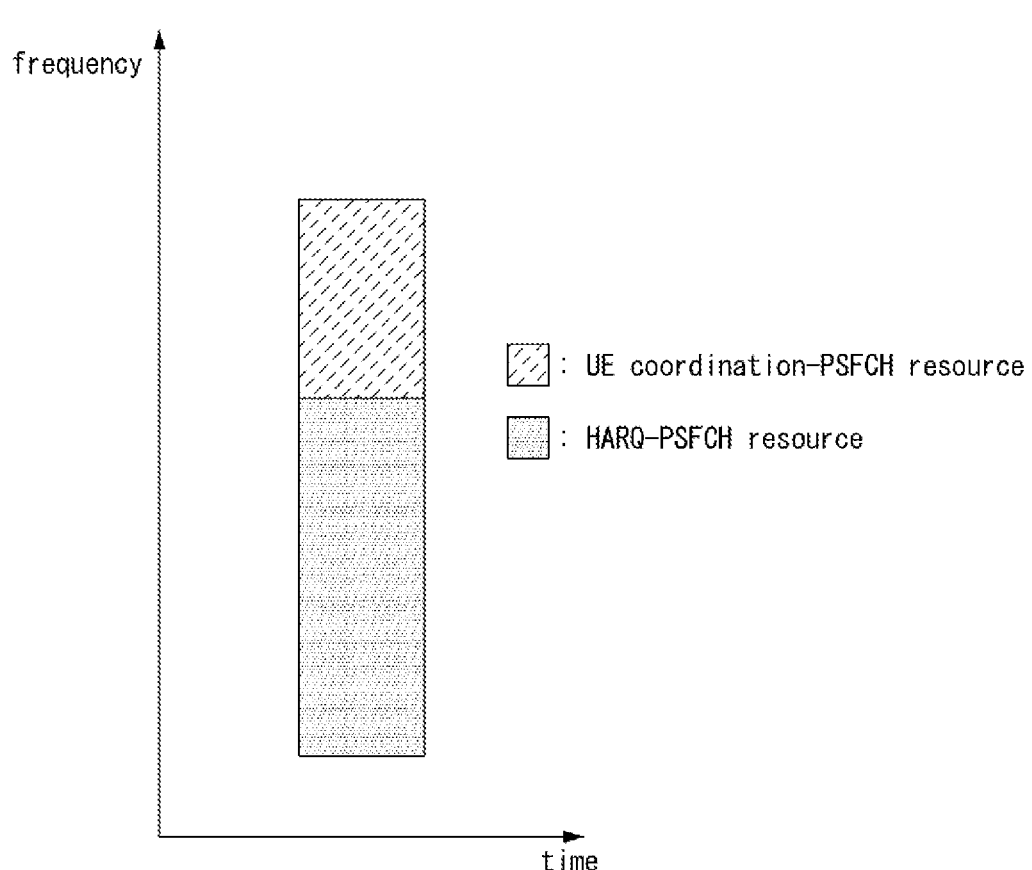
FIG. 9 is a conceptual diagram illustrating a first exemplary embodiment of PSFCH resources.

FIG. 9 is a conceptual diagram illustrating a first exemplary embodiment of PSFCH resources.

As shown in FIG. 9, HARQ-PSFCH resources and UE coordination-PSFCH resources may be configured within an SL resource pool. A start PRB of the HARQ-PSFCH resources may be a start PRB of the SL resource pool, and an PRB after an end PRB of the HARQ-PSFCH resources may be a start PRB of the UE coordination-PSFCH resources. The HARQ-PSFCH resources and the UE coordination-PSFCH resources may be multiplexed in the frequency domain. The HARQ-PSFCH resources may be used for transmission of HARQ-ACK(s) for PSSCH(s). The UE-coordination PSFCH resources may be used for transmission of inter-UE coordination information. A type (e.g., type A, type B, or type C) of a resource set included in inter-UE coordination information transmitted using the UE-coordination PSFCH resource may be indicated by an RRC message, MAC CE, and/or SCI.

Figure 10:
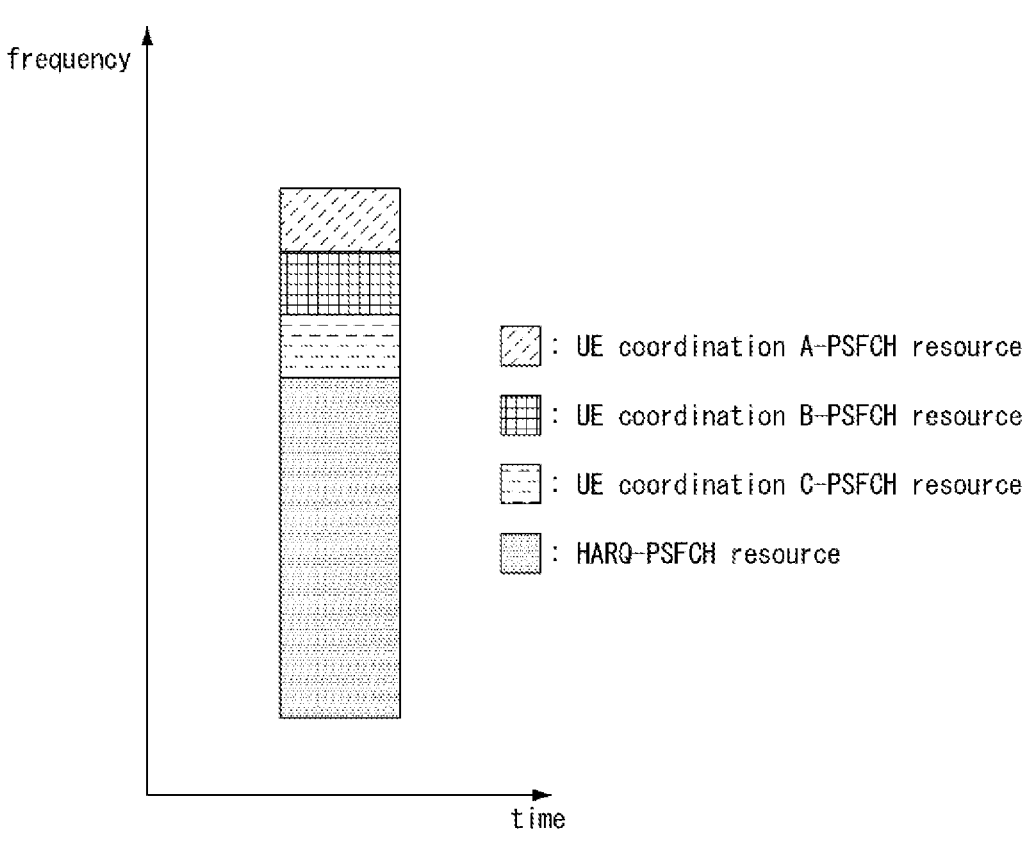
FIG. 10 is a conceptual diagram illustrating a second exemplary embodiment of PSFCH resources.

FIG. 10 is a conceptual diagram illustrating a second exemplary embodiment of PSFCH resources.

As shown in FIG. 10, HARQ-PSFCH resources and UE coordination-PSFCH resources may be configured within an SL resource pool. The HARQ-PSFCH resources and the UE coordination-PSFCH resources may be multiplexed in the frequency domain. The HARQ-PSFCH resources may be used for transmission of HARQ-ACK(s) for PSSCH(s). The UE coordination-PSFCH resource information may include UE coordination A-PSFCH resource information, UE coordination B-PSFCH resource information, and UE coordination C-PSFCH resource information. The UE coordination A-PSFCH resource information may indicate UE coordination A-PSFCH resource(s) used for transmission of inter-UE coordination information including the resource set A. The UE coordination B-PSFCH resource information may indicate UE coordination B-PSFCH resource(s) used for transmission of inter-UE coordination information including the resource set B. The UE coordination C-PSFCH resource information may indicate UE coordination C-PSFCH resource(s) used for transmission of inter-UE coordination information including the resource set C. The UE coordination A-PSFCH resource(s), the UE coordination B-PSFCH resource(s), and the UE coordination C-PSFCH resource(s) may be configured as orthogonal resources.

Alternatively, the HARQ-PSFCH resource information may be sl-PSFCH-Period, and the UE coordination-PSFCH resource information may be sl-PSFCH-Period-UECoordination. Each of the HARQ-PSFCH resource information and the UE coordination-PSFCH resource information may indicate the number of symbols. For example, the HARQ-PSFCH resource information may indicate x symbols, and the UE coordination-PSFCH resource information may indicate y symbols. The y symbols may start after the x symbols. Alternatively, the x symbols may start after the y symbols. Each of x and y may be a natural number. The HARQ-PSFCH resources and UE coordination-PSFCH resources may be configured as follows.

Figure 11:
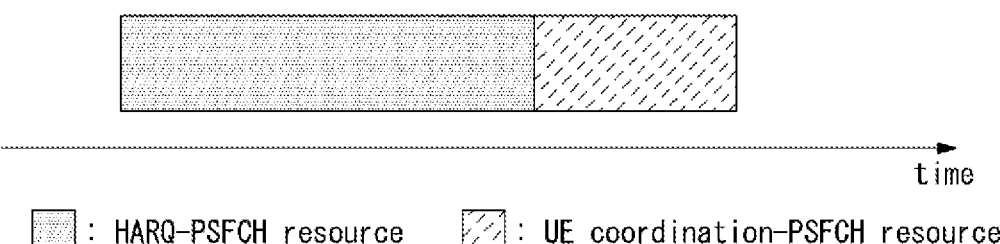
FIG. 11 is a conceptual diagram illustrating a third exemplary embodiment of PSFCH resources.

FIG. 11 is a conceptual diagram illustrating a third exemplary embodiment of PSFCH resources.

As shown in FIG. 11. HARQ-PSFCH resources and UE coordination-PSFCH resources may be multiplexed in the time domain. The HARQ-PSFCH resources may be used for transmission of HARQ-ACK(s) for PSSCH(s). The UE-coordination PSFCH resources may be used for transmission of inter-UE coordination information. A type (e.g., type A, type B, or type C) of a resource set included in the inter-UE coordination information transmitted using the UE-coordination PSFCH resource may be indicated by an RRC message, MAC CE, and/or SCI.

Figure 12:
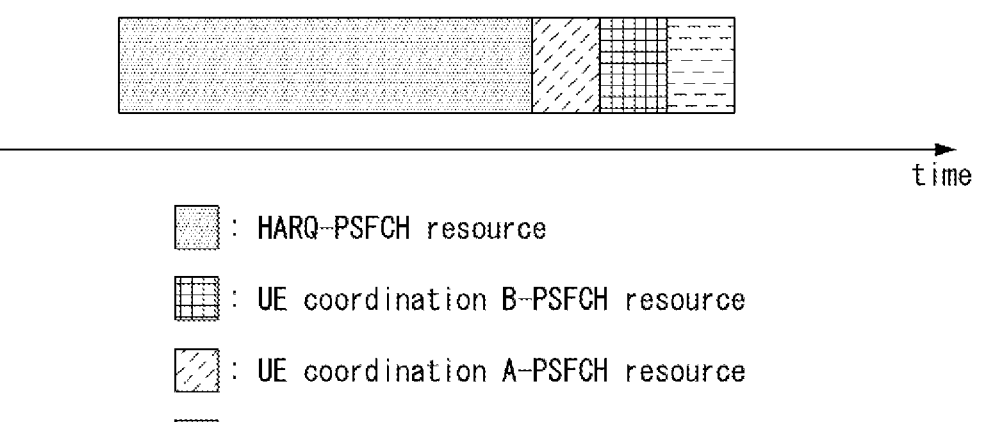
FIG. 12 is a conceptual diagram illustrating a fourth exemplary embodiment of PSFCH resources.

FIG. 12 is a conceptual diagram illustrating a fourth exemplary embodiment of PSFCH resources.

As shown in FIG. 12, HARQ-PSFCH resources and UE coordination-PSFCH resources may be multiplexed in the time domain. The HARQ-PSFCH resources may be used for transmission of HARQ-ACK(s) for PSSCH(s). The UE coordination-PSFCH resource information may include UE coordination A-PSFCH resource information, UE coordination B-PSFCH resource information, and UE coordination C-PSFCH resource information. The UE coordination A-PSFCH resource information may indicate UE coordination A-PSFCH resource(s) used for transmission of inter-UE coordination information including the resource set A. The UE coordination B-PSFCH resource information may indicate UE coordination B-PSFCH resource(s) used for transmission of inter-UE coordination information including the resource set B. The UE coordination C-PSFCH resource information may indicate UE coordination C-PSFCH resource(s) used for transmission of inter-UE coordination information including the resource set C. The UE coordination A-PSFCH resource(s), the UE coordination B-PSFCH resource(s), and the UE coordination C-PSFCH resource(s) may be configured as orthogonal resources.

Alternatively, the UE coordination-PSFCH resources may not be configured separately. The PSFCH resources indicated by the SL-PSFCH configuration information may be used for transmission of HARQ-ACK(s) or inter-UE coordination information. For example, when a HARQ feedback operation for PSSCH is enabled, the PSFCH resources may be interpreted as being used for HARQ-ACK transmission. When the HARQ feedback operation for PSSCH is disabled, the PSFCH resources may be interpreted as being used for transmission of inter-UE coordination information.

Referring again to FIG. 8, the UE-A and/or UE-B may receive the SL-PSFCH configuration information from the base station, and may identify the PSFCH resources based on the SL-PSFCH configuration information. When data to be transmitted to the UE-A (e.g., SL data) exists in the UE-B, the UE-B may transmit an SCI including scheduling information of the data to the UE-A. For example, the UE-B may transmit a first stage SCI to the UE-A on a PSCCH (S820). The UE-A may receive the first stage SCI from the IE-B, and may identify information element(s) included in the first stage SCI. The UE-B may transmit the data scheduled by the first stage SCI to the UE-A on a PSSCH (S830). In the step S830, a second stage SCI associated with the first stage SCI may be transmitted together with the data. The second stage SCI may include information indicating whether transmission of inter-UE coordination information is performed through a PSFCH resource, type of a resource set included in the inter-UE coordination information transmitted through the PSFCH resource, and/or information indicating enabling or disabling of a HARQ feedback operation. Alternatively, "transmission of inter-UE coordination information is performed through a PSFCH resource" may be configured by a higher layer message.

The UE-A may receive the second stage SCI and/or data on the PSSCH. The UE-A may transmit a HARQ-ACK for the data to the UE-B through a PSFCH resource (e.g., PSFCH resource associated with the PSSCH or data) (S840). In the step S840, the UE-A may transmit inter-UE coordination information along with the HARQ-ACK to the UE-B through the PSFCH resource. Alternatively, in the step S840, the UE-A may transmit only inter-UE coordination information to the UE-B through the PSFCH resource. The HARQ-ACK may be transmitted through the HARQ-PSFCH resource shown in FIGS. 9 to 12, and the inter-UE coordination information may be transmitted through the UE coordination-PSFCH resource shown in FIGS. 9 to 12. The UE-A may transmit the inter-UE coordination information including the resource set having the type indicated by the UE-B.

PSFCH resources for the resource set A, resource set B, and resource set C may be configured independently (e.g., orthogonally). In this case, the UE-A may transmit inter-UE coordination information including the resource set A using the UE coordination A-PSFCH resource shown in FIGS. 10 and/or 12. The UE-A may transmit inter-UE coordination information including the resource set B using the UE coordination B-PSFCH resource shown in FIGS. 10 and/or 12. The UE-A may transmit inter-UE coordination information including the resource set C using the UE coordination C-PSFCH resource shown in FIGS. 10 and/or 12.

Alternatively, in case that PSFCH resources for transmission of inter-UE coordination information are not separately configured, when the HARQ feedback operation is enabled, the UE-A may transmit the HARQ-ACK for the data by using a PSFCH resource without transmitting inter-UE coordination information. When the HARQ feedback operation is disabled, the UE-A may transmit inter-UE coordination information using a PSFCH resource without transmitting the HARQ-ACK for the data.

The UE-B may perform a monitoring operation on PSFCH resources indicated by the SL-PSFCH configuration information. The UE-B may determine a signal received in the HARQ-PSFCH resource as the HARQ-ACK for the PSSCH, and may determine a signal received in the UE coordination-PSFCH resource as the inter-UE coordination information. When the type of the resource set included in the inter-UE coordination information is previously indicated, the UE-B may determine that the inter-UE coordination information received in the UE coordination-PSFCH resource includes a resource set having the previously-indicated type.

The PSFCH resources for the resource set A, resource set B, and resource set C may be configured independently (e.g., orthogonally). In this case, the UE-A may transmit inter-UE coordination information including the resource set A using the UE coordination A-PSFCH resource shown in FIGS. 10 and/or 12. The UE-A may transmit inter-UE coordination information including the resource set B using the UE coordination B-PSFCH resource shown in FIGS. 10 and/or 12. The UE-A may transmit inter-UE coordination information including the resource set C using the UE coordination C-PSFCH resource shown in FIGS. 10 and/or 12.

Alternatively, information (e.g., HARQ-ACK or inter-LIE coordination information) transmitted through the PSFCH resource may vary depending on whether the HARQ feedback operation is enabled. In this case, when the HARQ feedback operation is enabled, the UE-B may determine that the HARQ-ACK for the data is received through the PSFCH resource. When the HARQ feedback operation is disabled, the UE-B may determine that the inter-UE coordination information is received through the PSFCH resource for the data.

The UE-B may select candidate resource(s) in consideration of the inter-UE coordination information (S850). In the step S850, the UE-B may select the candidate resource(s) by excluding resources indicated by the inter-UE coordination information (e.g., resources belonging to the resource set B or the resource set C). Alternatively, in the step S850, the UE-B may select candidate resource(s) including resources (e.g., resources belonging to the resource set A) indicated by the inter-UE coordination information.

Meanwhile, when preset priority value(s) are not provided, a priority value of PSFCH transmission for resource conflict indication (e.g., inter-UE coordination information including the resource set C) may be the smallest priority value among priority values of conflicting transport blocks (TBs). Alternatively, n priority values may be preset, and a priority value of PSFCH transmission for resource conflict indication may be one of the n priority values, n may be a natural number. For example, n may be 9.

When preset priority value(s) are not provided, a priority value of PSFCH reception for resource conflict indication (e.g., inter-UE coordination information including the resource set C) may be a priority value indicated by the SCI of the UE-B. Alternatively, n priority values may be preset, and a priority value of PSFCH reception for resource conflict indication may be one of the n priority values. The 'n' may be a natural number. For example, n may be 9.

Figure 13:
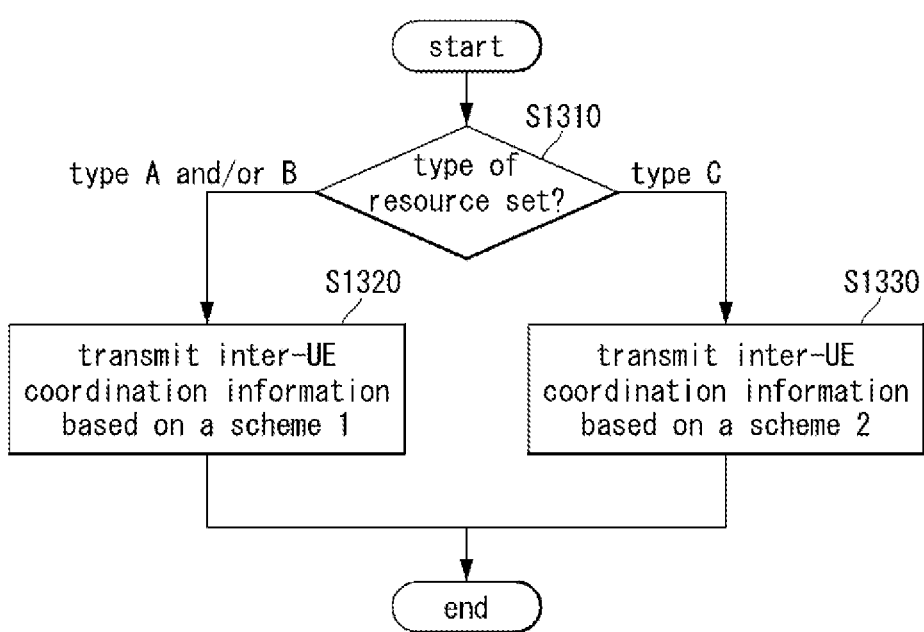
FIG. 13 is a flowchart illustrating a third exemplary embodiment of a method of transmitting inter-UE coordination information.

FIG. 13 is a flowchart illustrating a third exemplary embodiment of a method of transmitting inter-UE coordination information.

As shown in FIG. 13, the UE-A may generate inter-UE coordination information including a resource set. When the explicit trigger scheme is used and transmission of inter-UE coordination information (e.g., inter-UE coordination information including a resource set having a specific type) is requested by the UE-B, the UE-A may generate inter-UE coordination information (e.g., inter-UE coordination information including a resource set having the specific type). Alternatively, when the event trigger scheme is used and a specific event occurs, the UE-A may generate inter-UE coordination information. The UE-A may transmit the inter-UE coordination information by using a different scheme according to the type of the resource set included in the inter-UE coordination information. A scheme according to the type of the resource set may be defined as shown in Table 12 below.

TABLE 12

| Type of resource set included in inter-UE coordination information | Scheme | Container used in each scheme |
|---|---|---|
| Type A and/or Type B | Scheme 1 | SCI (e.g., SCI format 2-C) and/or MAC-CE |
| Type C | Scheme 2 | PSFCH |

The UE-A may identify the type of the resource set to be transmitted through the inter-UE coordination information (S1310). When the type of the resource set is the type A and/or B, the UE-A may transmit inter-UE coordination information including the resource set A and/or B based on a scheme 1 (S1320). When the type of the resource set is the type C, the UE-A may transmit inter-UE coordination information including the resource set C based on a scheme 2 (S1330).

In the step S1320, the UE-A may transmit the inter-UE coordination information including the resource set A and/or B to the UE-B by using an SCI (e.g., first stage SCI or second stage SCI). That is, the inter-UE coordination information may be included in the SCI (e.g., first stage SCI or second stage SCI). The second stage SCI including the inter-UE coordination information may have the SCI format 2-C or a new SCI format. The SCI format 2-C may further include information (e.g., 1-bit indicator) indicating that the corresponding SCI format 2-C includes the inter-UE coordination information (e.g., inter-UE coordination information including the resource set A and/or B). Alternatively, in the step S1320, the UE-A may transmit the inter-UE coordination information including the resource set A and/or B to the UE-B by using a MAC CE. That is, the inter-UE coordination information may be included in the MAC CE. The MAC CE may further include information (e.g., 1-bit indicator) indicating that the MAC CE includes the inter-UE coordination information (e.g., inter-UE coordination information including the resource sets A and/or B).

In the step S1330, the UE-A may transmit inter-UE coordination information including the resource set C to the UE-B by using a PSFCH. That is, the inter-UE coordination information may be included in the PSFCH. The inter-UE coordination information may be transmitted through the PSFCH according to the exemplary embodiment of FIG. 8.

The UE-B may receive the inter-UE coordination information from the UE-A. For example, the UE-B may receive the SCI (e.g., SCI format 2-C) or MAC CE from the UE-A, and may identify the inter-LYE coordination information included in the SCI or MAC CE. The UE-B may determine whether the corresponding SCI or MAC CE includes the inter-UE coordination information based on the information (e.g., 1-bit indicator) included in the SCI or MAC CE. When the above-described information indicates that the SCI or MAC CE includes the inter-UE coordination information, the UE-B may obtain the inter-UE coordination information from the SCI or MAC CE. When the inter-UE coordination information is received through the SCI or MAC CE, the UE-B may determine that the received inter-UE coordination information includes the resource set A and/or B. The UE-B may perform sidelink communications in consideration of the resource sets A and/or B.

Alternatively, the UE-B may receive the PSFCH from the UE-A. When the inter-UE coordination information is received through the PSFCH, the UE-B may determine that the received inter-UE coordination information includes the resource set C. The UE-B may perform sidelink communication in consideration of the resource set C.

In the above-described exemplary embodiments, a combination of at least two or more among the association relationship between inter-UE coordination information and SCI, the association relationship between inter-UE coordination information and transmission scheme, the association relationship between inter-UE coordination information and cast type, the association relationship between inter-UE coordination information and a surrounding environment of a communication node, and the association relationship between inter-UE coordination information and container. When the combination of association relationships is satisfied, inter-UE coordination information including a resource set having a specific type may be transmitted. For example, when a combination of the association relationship between inter-UE coordination information and container and the association relationship between inter-UE coordination information and transmission scheme is used, inter-UE coordination information is transmitted through a second stage SCI, and the inter-UE coordination information is transmitted based on the explicit trigger scheme, the UE-A may transmit the inter-UE coordination information including the resource set A.

The inter-UE coordination information (e.g., transmission/reception operation of the inter-UE coordination information) may be configured specifically, independently, or commonly based on at least one of a resource pool, service type, priority, whether a power saving operation is performed, QoS parameter (e.g., reliability, delay), cast type, terminal type (e.g., vehicle (V)-UE or pedestrian (P)-UE), or combination thereof. The above-described configuration may be performed by the network and/or the base station. Alternatively, the operation of the aforementioned UE (e.g., UE-A and/or UE-B) (e.g., the selection operation of the scheme) may be implicitly determined based on preconfigured parameter(s).

Whether each method (e.g., each rule) in the above-described exemplary embodiments is applied may be configured based on at least one of a condition, a combination of conditions, a parameter, or a combination of parameters. Whether to apply each method may be configured by the network and/or the base station. Whether to apply each method may be configured in a resource pool-specific manner or a service-specific manner. Alternatively, whether to apply each method may be configured by PC5-RRC signaling between terminals.

The exemplary embodiments of the present disclosure may be implemented as program instructions executable by a variety of computers and recorded on a non-transitory computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method of a first user equipment (UE) comprising:
receiving first physical sidelink feedback channel (PSFCH) resource information used for transmission of hybrid automatic repeat request-acknowledgement (HARQ-ACK) and second PSFCH resource information used for transmission of inter-UE coordination information from a base station;
generating the inter-UE coordination information including a resource set;
generating a PSFCH including the inter-UE coordination information based on the resource set including a conflicting resource; and
transmitting the PSFCH including the inter-UE coordination information using a PSFCH resource indicated by the second PSFCH resource information to a second UE.

2. The method according to claim 1, further comprising:
generating sidelink control information (SCI) or a medium access control (MAC) control element (CE) including the inter-UE coordination information based on the resource set including a preferred resource or a non-preferred resource; and
transmitting the SCI or the MAC CE including the inter-UE coordination information to the second UE.

3. The method according to claim 1, wherein the PSFCH is a response to a physical sidelink shared channel (PSSCH) received from the second UE.

4. The method according to claim 1, further comprising receiving, from the second UE, a message requesting transmission of the inter-UE coordination information, wherein the inter-UE coordination information is transmitted when the message is received.

5. A method of a second user equipment (UE) comprising:
receiving first physical sidelink feedback channel (PSFCH) resource information used for transmission of hybrid automatic repeat request-acknowledgement (HARQ-ACK) and second PSFCH resource information used for transmission of inter-UE coordination information from a base station;
receiving a PSFCH including the inter-UE coordination information using a PSFCH resource indicated by the second PSFCH resource information from a first UE;
identifying a conflicting resource set included in the inter-UE coordination information based on the PSFCH being received in the PSFCH resource indicated by the second PSFCH resource information; and
performing sidelink communication in consideration of the resource set.

6. The method according to claim 5, further comprising:
receiving sidelink control information (SCI) including the inter-UE coordination information from the first UE; and
identifying a preferred resource or a non-preferred resource included in the inter-UE coordination information based on the SCI including the inter-UE coordination information being received.

7. The method according to claim 5, further comprising:
receiving a medium access control (MAC) control element (CE) including the inter-UE coordination information from the first UE; and
identifying a preferred resource or a non-preferred resource included in the inter-UE coordination information based on the MAC CE including the inter-UE coordination information being received.

8. The method according to claim 5, wherein the PSFCH is a response to a physical sidelink shared channel (PSSCH) transmitted by the second UE.

9. The method according to claim 5, further comprising transmitting, to the first UE, a message requesting transmission of the inter-UE coordination information, wherein the inter-UE coordination information is received after the message is transmitted.

* * * * *